United States Patent

[11] 3,622,552

[72] Inventors Junichi Fukuda;
Kijuro Tashiro; Michio Koga; Toshio Hori; Heiichiro Ogawa; Eiichi Takeshita; Katsuo Akaiwa, all of Yokkaichi-shi, Japan
[21] Appl. No. 866,082
[22] Filed Oct. 3, 1969
[45] Patented Nov. 23, 1971
[73] Assignee Mitsubishi Petrochemical Co., Ltd. Tokyo, Japan
[32] Priorities Apr. 27, 1965
[33] Japan
[31] 40/24656;
Mar. 2, 1966, Japan, No. 41/12740
Continuation of application Ser. No. 543,535, Apr. 19, 1966, now abandoned. This application Oct. 3, 1969, Ser. No. 866,082

[54] PROCESS FOR PRODUCING CRYSTALLINE OLEFIN POLYMERS AND CATALYST COMPOSITIONS THEREFOR
3 Claims, No Drawings
[52] U.S. Cl. .................................. 260/88.2, 260/93.7, 260/94.9, 252/429
[51] Int. Cl. ................................. C08f 1/56, C08f 3/10, B01j 11/84
[50] Field of Search ................................. 260/94.9 C, 93.7, 429 B, 88.2

[56] References Cited
UNITED STATES PATENTS

| 2,965,627 | 12/1960 | Dield ............................. | 260/94.9 |
| 3,178,401 | 4/1965 | Coover et al. ................. | 260/94.9 |
| 3,301,834 | 1/1967 | Christman ..................... | 260/94.9 |
| 3,311,596 | 3/1967 | Berding et al. ................ | 260/94.9 |

FOREIGN PATENTS

| 907,386 | 10/1962 | Great Britain ................ | 252/429 |

Primary Examiner—James A. Seidleck
Attorney—Stevens, Davis, Miller and Mosher

ABSTRACT: Polymerization of olefins and catalyst therefor, said catalyst comprising polymerizing at least one member selected from the group consisting of ethylene, propylene, butene-1 and styrene in the presence of a catalyst composition comprising (1) an organoaluminum compound having the formula, $AlR_2X$ wherein R represents a hydrocarbon residue selected from the group consisting of alkyl, aryl, aralkyl, alkaryl and cycloalkyl groups and X represents a halogen atoms selected from the group consisting of chlorine, bromine and iodine, (2) a halide of a transition metal of Groups IV, V and VI of the Periodic Table of the Elements, and (3) an aliphatic carboxylic ester having a side chain on a carbon atom in a α-position to the ester carbon atom, the molar proportion of said organoaluminum compound, said halide of transition metal and said aliphatic carboxylic ester being 10–0.5 : 1 : 0.01–1.

PROCESS FOR PRODUCING CRYSTALLINE OLEFIN POLYMERS AND CATALYST COMPOSITIONS THEREFOR

This application is a streamlined continuation of application Ser. No. 543,535, filed Apr. 19, 1966, and now abandoned.

This invention relates to the production of crystalline homopolymers or copolymers of olefin, and more particularly, to the processes for producing highly crystalline homopolymers or copolymers of olefin having improved stereospecificity by using a novel catalyst composition. It further relates to novel catalyst compositions of utility in such processes.

It is well known that a crystalline polyolefin can be produced by polymerizing an olefin in an inert solvent in the presence of catalyst compositions consisting of organometallic compounds containing a metal of Groups I, II and III of the Periodic Table of the Elements and halides of a transition metal of Groups IV, V and VI of said Periodic Table.

It is also known well that in these processes a combination of organoaluminum compounds as the organometallic compound and titanium trichloride as the halide of transition metal can be successfully used for obtaining crystalline polyolefin in a high yield.

Although an olefin may be polymerized to form a homopolymer thereof in the presence of the binary catalyst composition mentioned above which consists of organoaluminum compound and titanium trichloride, there are many inconveniences accompanied by such process.

For example, according to the results of our experiments, the polymerization of propylene in the presence of a catalyst composition consisting of triethylaluminum and titanium trichloride gives from 70 to 85 percent of insoluble polymer in boiling heptane i.e. crystalline polymer of propylene, based on the total weight of the resultant polypropylene.

Also, the use of a catalyst composition consisting of diethylaluminum chloride and titanium trichloride in the above-mentioned process produces from 85 to 90 percent of insoluble polymer in boiling heptane based on the total weight of the resultant polymer.

As exemplified in the above, even with the use of said catalysts which have been considered to produce relatively less polymer which is soluble in boiling heptane among the so-called Ziegler-Natta catalysts, the percentage of polymer which is soluble in boiling heptane is still as high as from 85 to 90 percent based on the total weight of the resultant polymer.

Further, there exists similar tendency in producing copolymers by copolymerizing two or more monomeric olefin. For example, in the copolymerization of propylene with ethylene, the yield of the contemplated crystalline copolymer is decreased considerably due to the fact that the amount of noncrystalline copolymer increases rapidly and undesirably as the ethylene content increases in the resulting copolymer, as reported by G. Bier in Augewandte Chemie, 73, 186(1961)and also by K. Takagi et al. In plastic Age 11(9), 5(1965).

The results of our experiments in this respect reveal that ethylene-propylene copolymer having 2 percent of ethylene content obtained by using a catalyst composition consisting of triethylaluminum and titanium trichloride contains from 40 to 50 percent of copolymer which is insoluble in boiling heptane based on the total weight of the resultant copolymer. Also, the use of a catalyst composition consisting of diethylaluminum chloride and titanium trichloride in said ethylene-propylene copolymerization gives from 50 to 60 percent of copolymer which is insoluble in boiling heptane.

As noted above, even if the catalysts which have been believed to produce relatively less copolymer which is soluble in boiling heptane among the so-called Ziegler-Natta catalysts is used in the copolymerization of olefin, the percentage of the soluble copolymer in boiling heptane is extremely high i.e. from 35 to 60 percent based on the total weight of the resultant copolymer.

The high content of noncrystalline polymer may cause the great difficulties in carrying out the production of homopolymer or copolymer of olefin in an industrial scale.

Namely, in the first place, no suitable use has been known as yet for these heptane-soluble homopolymers or copolymers which are normally noncrystalline, therefore, they have to be discarded as a useless waste. Furthermore, the undesirable formation of these noncrystalline polymers not only causes unnecessary consumption of monomers but also necessitates extraction of noncrystalline polymers from the resultant polymers in order to obtain pure crystalline polymers. Thus, there are great disadvantages from the commercial point of view such as requirement for increased numbers and capacity of equipment, complications in processes and so forth.

In the second place, if the percentage of the heptane-soluble polymer exceeds 50 percent based on the total weight of the resultant polymer, an operation on the commercial basis often becomes practically impossible in the ordinary polymerization process of olefin due to the inconveniences such as impossibility of removal of heat in the reactor, clogging in pipes, decreased capacity of reactor and so forth which are attributable to the increase in viscosity of polymer slurry.

Further, in the third place, when the percentage of the polymer which is soluble in boiling heptane is exceedingly high, an ordinary extracting operation which is added as a part of the whole production processes is not sufficient to produce polymers of desirable crystallinity. Therefore, there is a disadvantage in that a separate, special extracting equipment, rather an ordinary extracting stage in the process, must be equipped in order to obtain a good product having desirable crystallinity.

It is, accordingly, very significant from the commercial point of view to find out a catalyst composition which produces less undesirable noncrystalline polymers in the polymerization of olefin. The discovery of such a catalyst composition, if achieved, would not only reduce the production cost but also ensure more stabilized operation of the factory and improve the quality of the produced polymers. These points have utter importance in the commercial production of crystalline homopolymers and copolymers of olefin at all times.

However, catalyst compositions which give adverse effect on the molecular weight of the resultant polymer or decrease greatly the polymerization rate or bulk density of the resultant solid polymer may not be successfully used in the commercial production of olefin polymers, even if they satisfy the requirement for producing less noncrystalline polymers.

It is an object of this invention, therefore, to provide a novel catalyst composition which enables the production of crystalline homopolymers or copolymers, without affecting the polymerization rate and molecular weight of the resultant polymers.

It is a further object of this invention to provide a novel process for the production of crystalline homopolymers or copolymers using such a catalyst composition.

It has been found that these objects mentioned above can be accomplished by polymerizing one or more olefin in the presence of a mixed catalyst composition which comprises organoaluminum compounds of the general formula $AlR_2X$, wherein R represents hydrocarbon residue such as alkyl, aryl, aralkyl, alkaryl and cycloalkyl groups and X represents halogen such as chlorine, bromine and iodine; halides of a transition metal of Groups IV, V and VI of aforesaid Periodic Table and saturated or unsaturated carboxylic ester having a side chain on a carbon atom in α-position to ester carbon atoms.

More particularly, according to this invention, there is provided a novel process for the production of crystalline homopolymers or copolymers of olefin characterized in that one or more olefin are polymerized in the presence of a catalyst composition comprising organoaluminum compounds of the general formula $AlR_2X$, wherein R and X have the same meaning as defined above, halides of a transition metal of Groups IV, V and VI of aforesaid Periodic Table, and saturated or unsaturated carboxylic ester having a side chain on a carbon atom in α-position to ester carbon atoms.

Organoaluminum compounds of the general formula AlR$_2$X, wherein R and X have the same meaning as defined above, which may be used in the process of this invention include ones having hydrocarbon residue such as alkyl, aryl, aralkyl, alkaryl, cycloalkyl and the like. Particularly, organoaluminum compounds having lower alkyl group such as ethyl, propyl and butyl groups, for example, diethylaluminum chloride, di-n-propylaluminum chloride, di-iso-butylaluminum chloride and the like are preferably used.

Halides of a transition metal of Groups IV, V and VI of aforesaid Periodic Table which may be used in the process of this invention includes halides of titanium, zirconium, vanadium, chromium, molybdenum, tungsten and the like, for example, titanium trichloride, titanium tribromide, titanium tetrachloride, zirconium tetrachloride, vanadium trichloride, chromium trichloride, molybdenum trichloride and the like. Of these compounds mentioned above, particularly, titanium trichloride can be used preferably in the industrial production.

The halides containing other component in small proportion, for example, titanium trichloride obtained by reduction of titanium tetrachloride by aluminum which usually contains a mol of aluminium chloride per 3 mols of titanium trichloride, may also be used effectively in the process of this invention. If these halides are activated by the treatment in ball mill or vibrating mill, the better result can be obtained.

Saturated or unsaturated carboxylic esters which may be used in the process of this invention include, for example, methyl methacrylate, ethyl methacrylate, propyl methacrylate, butyl methacrylate, methyl isobutyrate, ethyl methylvinylacetate, methyl methylethylacetate, butyl methylethylacetate and the like.

The proportion of the constituents of the catalyst composition of this invention, i.e., amount of organoaluminum compounds, halides of a transition metal and saturated or unsaturated carboxylic esters employed, is 10–0.5:1:0.01–1 in molar ratio, and preferably 3–1.5:1:0.05–0.5 in molar ratio. However, the optimum proportion varies in a wide range within said limit depending upon the kind of monomer, composition of the monomers, polymerization temperature, kind of catalyst compositions and solvents, and other polymerizing conditions.

In practicing the process of this invention, a molecular weight controller such as hydrogen may be used without giving any adverse effect to this process.

The polymerization temperatures between room temperature and 110° C. may be conveniently used and temperatures from 50° to 90° C. are preferred.

Solvents which may be used in the process of this invention are inert solvent of saturated hydrocarbons or aromatic hydrocarbons such as hexane, heptane, octane, cyclohexane, benzene, toluene and the like, or a mixture of these mentioned above.

Examples of monomeric olefin which may be used in the polymerization reaction of this invention include ethylene, propylene, buten-1, styrene and the like, and mixture thereof.

The process of this invention is particularly suitable for polymerizing propylene, and the better result can be obtained in the copolymerization of propylene with ethylene in a monomeric ratio so as to produce polypropylene having ethylene content of less than 5 percent by weight.

The polymerization process of this invention per se is substantially the same as that of the prior art using catalyst compositions of Ziegler-Natta catalysts. However, as noted above, the process of this invention enables the production of highly crystalline homopolymer or copolymer of olefin without giving any adverse effect to the polymerization rate and molecular weight of the resultant polymers.

Another feature of the process of this invention is that polypropylene having from 1 to 5 percent by weight of ethylene content obtained by the use of ternary catalyst compositions of this invention may be formed into a film of greatly improved quality as will be illustrated in the example.

This invention may be further explained in the following examples more practically, however, it should not be construed in any way that these examples restrict the present invention because they are given merely by way of illustration.

EXAMPLE 1

To a 1000 cc. capacity stainless steel autoclave provided with an agitator and a temperature regulator, which had been flushed with nitrogen several times, there were charged 400 cc. of heptane, 1.0 g. of diethylaluminum chloride, 0.51 g. of titanium trichloride and 0.02 g. of methyl methacrylate and further 100 cc. of hydrogen at normal temperature and pressure was introduced thereto.

After the temperature of the autoclave was raised to 70° C., the polymerization reaction was carried out for 2 hours while supplying propylene thereto at 4 kg./cm.$^2$ (Gauge) so as to maintain the constant pressure.

After the completion of the polymerization reaction, the reaction mixture was treated with 50 cc. of methanol for 2 hours at 70° C. At the end of the period, the polymer slurry was filtered off and the polymer cake was dried in vacuo for 6 hours at 60° C. to give 125.0 g. of white solid polymer.

The polymer thus obtained was extracted with boiling n-heptane for 24 hours and 2.0 g. of noncrystalline polymer was extracted. On the other hand, the filtrate was vaporized to dryness and found to contain 4.2 g. of noncrystalline polymer. Therefore, the percentage of polymer which was insoluble in boiling heptane based on the total weight of the resultant polymer may be given as 95.2 percent by the following equation:

$$\frac{125.0-2.0}{125.0+4.2} \times 100 = 95.2(\%)$$

The intrinsic viscosity of the resultant polymer measured in tetralin at 135° C. was 2.14, and the bulk density of the white solid polymer was 0.40 g./cc.

For comparison, the polymerization reaction was repeated according to the above-mentioned procedures and in the same conditions except that no methyl methacrylate was added.

As a result, 121.0 g. of white solid polymer was obtained and the percentage of polymer which was insoluble in boiling heptane was 89.5 percent based on the total weight of the resultant polymer. The intrinsic viscosity of the resultant polymer measured in tetralin at 135°C. was 2.21, and the bulk density was 0.39 g./cc.

EXAMPLE 2

The polymerization reaction was carried out according to the same procedures as described in example 1, except that the amount of methyl methacrylate was changed to 0.08 g.

115.0 g. of white solid polymer was obtained and the percentage of polymer which was insoluble in boiling heptane was 95.9 percent based on the total weight of the resultant polymer. The intrinsic viscosity of the resultant polymer measure in tetralin at 135°C. was 2.28 and the bulk density was 0.39 g./cc.

EXAMPLE 3

0.6 g. of diethylaluminum chloride, 0.25 g. of titanium trichloride and 0.03 g. of methyl methacrylate were added to 400 cc. of heptane according to the same procedures as in example 1. Propylene was introduced thereto without feeding hydrogen so as to maintain the constant pressure of 4 kg./cm.$^2$ (Gauge) at 70° C.

After the polymerization reaction was carried out for 4 hours according to the same procedures as described in example 1, 72.3 g. of white solid polymer was obtained and the percentage of polymer which was insoluble in boiling heptane was 94.2 percent based on the total weight of the resultant polymer.

The polymerization reaction was repeated in the same conditions as described in the above except that adding no methyl methacrylate. As a result, 78.2 g. of white solid polymer was obtained and the percentage of polymer which was insoluble in boiling heptane was 88.7 percent based on the total weight of the resultant polymer.

EXAMPLE 4

In this example, propylene was polymerized according to the same procedures as described in example 3 except that 0.028 g. of isobutyl methacrylate was substituted for methyl methacrylate and 80 cc. of hydrogen at normal temperature and pressure was introduced thereto. 93.4 g. of white solid polymer was obtained and the percentage of polymer which was insoluble in boiling heptane was 94.4 percent based on the total weight of the resultant polymer. The intrinsic viscosity of the resultant polymer measured in tetralin at 135° C. was 2.38.

For comparison, the polymerization reaction was repeated by adding no isobutyl methacrylate. As a result, 94.2 g. of white solid polymer was obtained and the percentage of polymer which was insoluble in boiling heptane was 89.0 percent based on the total weight of the resultant polymer. The intrinsic viscosity of the resultant polymer measured in tetralin at 135° C. was 2.40.

EXAMPLE 5

Propylene was polymerized according to the same procedures as described in example 4 except that 0.030 g. of ethyl acrylate, which is outside of the scope of this invention, was substituted for isobutyl methacrylate. As a result, 93.4 g. of white solid polymer was obtained and the percentage of polymer which was insoluble in boiling heptane was 90.2 percent based on the total weight of the resultant polymer.

EXAMPLE 6

Propylene was polymerized according to the same procedures as described in example 4 except that 0.028 g. of isobutyric acid, which is outside of the scope of this invention, was substituted for isobutyl methacrylate. 79.2 g. of white solid polymer was obtained and the percentage of polymer which was insoluble in boiling heptane was 89.6 percent based on the total weight of the resultant polymer.

EXAMPLE 7

Propylene was polymerized according to the same procedures as described in example 4 except that 0.031 g. of methyl isobutyrate was substituted for isobutyl methacrylate. 85.5 g. of white solid polymer having intrinsic viscosity of 2.45 as measured in tetralin at 135° C. was obtained. The percentage of polymer which was insoluble in boiling heptane was 94.9 percent based on the total weight of the resultant polymer.

EXAMPLE 8

Propylene was polymerized according to the same procedures as described in example 4 except that 0.032 g. of methyl methylethylacetate was substituted for isobutyl methacrylate.

82.5 g. of white solid polymer was obtained and the percentage of polymer which was insoluble in boiling heptane was 95.1 percent based on the total weight of the resultant polymer. The intrinsic viscosity of the resultant polymer measure in tetralin at 135° C. was 2.28.

EXAMPLE 9

To a 3 liter capacity stainless steel autoclave provided with an agitator and a temperature regulator which had been flushed with nitrogen several times, there were added 1500 ml. of heptane, 2.40 g. of diethyl-aluminium chloride, 1.15 g. of titanium trichloride and 0.147 g. of methyl methacrylate, then, 600 ml. of hydrogen at normal temperature and pressure were introduced thereto.

After the temperature of the autoclave was raised to 65° C., a mixed gas consisting of 97.72 percent by volume of propylene and 2.28 percent by volume of ethylene was supplied thereto so that the pressure may be raised by 0.2 kg./cm.$^2$ in every 5 minutes for the period of 1 hour after the polymerization reaction was initiated and maintain a constant pressure thereafter, and the reaction was carried out for 4 hours.

After the completion of the polymerization reaction, the reaction mixture was treated with 120 ml. of butanol for 2 hours at 70° C.

At the end of the period, the polymer slurry was filtered off and the polymer cake was dried for 6 hours at 60° C. under a reduced pressure to give 230.5 g. of white solid polymer. The polymer thus obtained was extracted with boiling n-heptane for 24 hours and 20.7 g. of noncrystalline polymer was extracted.

On the other hand, the filtrate obtained in the above was vaporized to dryness and it was found to contain 24.9 g. of noncrystalline polymer. Therefore, the percentage of polymer which was insoluble in boiling heptane may be given as 82.0 percent by the following equation:

$$\frac{230.5-20.7}{230.5+24.9}\times100=82.0(\%)$$

The melt index of the resultant white solid polymer measured in accordance with ASTM method was 4.55 and ethylene content of the resultant polymer according to infrared spectrum analysis was 1.40 percent by weight.

For comparison, the polymerization reaction was repeated in the same conditions as described above except that no methyl methacrylate was added. The polymer slurry thus obtained was treated by the same procedures as in the above and 255.5 g. of white solid polymer was obtained. The percentage of polymer which was insoluble in boiling heptane was 74.6 percent based on the total weight of the resultant polymer. The melt index of the resultant polymer was 4.10 and ethylene content was 1.37 percent by weight.

EXAMPLE 10

The polymerization reaction was carried out in the same conditions as in example 9 except that 0.212 g. of isobutyl methacrylate was substituted for methyl methacrylate. The polymer thus obtained was treated in the same manner as in example 9 and 249.8 g. of white SOLID polymer was obtained. The percentage of polymer which was insoluble in boiling heptane was 79.7 percent based on the total weight of the resultant polymer. The melt index of the resultant polymer was 3.90 and the ethylene content was 1.42 percent by weight.

EXAMPLE 11

To a 3 liter stainless steel autoclave provided with an agitator and a temperature regulator which had been flushed with nitrogen several times, there were charged 1500 ml. of heptane, 2.40 g. of diethylaluminum chloride, 1.19 g. of titanium trichloride and 0.155 g. of methyl methacrylate, and the further, 700 ml. of hydrogen at normal temperature and pressure were introduced thereto.

After the temperature of the autoclave was raised to 70°C., the polymerization reaction was carried out for 2½ hours while a mixed gas consisting of 93.2 percent by volume of propylene and 6.8 percent by volume of buten-1 was supplied thereto so as to maintain the constant pressure of 3 kg./cm.$^2$ (gauge).

After the completion of the reaction, the reaction mixture was treated in the same conditions as in example 9 to give 292.3 g. of white solid polymer. The resultant polymer was extracted with boiling heptane for 24 hours and 23.5 g. of polymer was obtained.

On the other hand, the filtrate was vaporized to dryness and it was found to contain 15.5 g. of copolymer, therefore, the percentage of polymer which was insoluble in boiling heptane was 80.5 percent based on the total weight of the resultant polymer. The melt index of the obtained white solid polymer was 11.2, and ethylene content according to infrared spectrum analysis was 6.2 percent by weight.

For comparison, the polymerization reaction was repeated in the same conditions as described above except that no methyl methacrylate was added, and the resultant polymer slurry was treated also in the same manner as above.

312.5 g. of white solid polymer having melt index of 9.8 and buten-1 content of 6.5 percent by weight was obtained. The percentage of polymer which was insoluble in boiling heptane was 70.6 percent based on the total weight of the resultant polymer.

EXAMPLE 12

To an autoclave of about 150 liter capacity provided with an agitator and a temperature regulator which had been flushed with nitrogen several times, there were charged 55 liter of heptane, 110 g. of diethylaluminum chloride, 55 g. of titanium trichloride and 7.2 g. of methyl methacrylate.

While controlling the polymerization temperature at 65° C. and hydrogen concentration of gaseous phase of the autoclave at 3.5 percent by volume, a mixed gas consisting of 2.1 percent volume of ethylene and 95.9 percent by volume of propylene was supplied at the rate of 5 kg./hr. thereto for 5½ hours, and the gas pressure at the completion of the reaction was 2.9 kg./cm.(Gauge).

After the completion of the reaction, unreacted gases were purged and the catalyst was decomposed by treating with butanol for 2 hours at 75°C., then the catalyst was washed off with aqueous dilute hydrochloric acid and The resultant polymer slurry was filtered off by a centrifuge. The polymer cake was dried for 6 hours at 60° C. under a reduced pressure to give 22.3 kg. of white solid polymer, which will be referred to as "product A" hereinafter.

The percentage of polymer which was insoluble in boiling heptane was 68.8 percent based on the total weight of the resultant polymer and melt index of the white solid polymer thus obtained was 7.8, and ethylene content according to infrared spectrum analysis was 2.19 percent by weight.

For comparison, the polymerization reaction was repeated in the same conditions as described above except that no methyl methacrylate was added and the gas pressure at the completion of the reaction was 2.4 kg./cm.$^2$ (Gauge).

The resultant polymer slurry was treated in the same manner as above and 23.1 kg. of white solid polymer, which will be referred to as "Product B" hereinafter, was obtained. The percentage of polymer which was insoluble in boiling heptane was 61.5 percent based on the total weight of the resultant polymer, and the melt index of the white solid polymer thus obtained was 9.6 and ethylene content was 2.15 percent by weight.

Both of the above-mentioned Products A and B were formed into films and the results of the comparison in quality are given in the following Table:

TABLE

| | Young's modulus of elasticity *1 | Blocking *2 | Bleeding |
|---|---|---|---|
| Product A | 6500 dyne/cm.$^2$ (Strong) | 270 g./10 cm.$^2$ (Good) | Less |
| Product B | 5600 dyne/cm.$^2$ (Weak) | 410 g./10 cm.$^2$ (Bad) | More |

*1 Measured by Instron Type Tensile Tester.
*2 Measured by Slip Tester Method.

As can be noted from the above table, the quality of the film of Product A is greatly improved over that of Product B.

We claim:
1. Process for producing a crystalline olefin polymer which comprises polymerizing propylene or a mixture of propylene and not more than 5 percent by weight of ethylene in the presence of a catalyst composition comprising (1) an organoaluminum compound selected from the group consisting of di-ethyl-aluminum chloride, di-n-propyl-aluminum chloride and di-iso-butyl-aluminum chloride, (2) titanium trichloride, and (3) methyl methacrylate, the molar proportion of said organoaluminum compound, said titanium trichloride and said methyl methacrylate being 10–0.5:1:0.01–1.

2. Process according to claim 1 wherein said polymerization is carried out in an inert solvent selected from the group consisting of hexane, heptane, octane, cyclohexane, benzene and toluene at a temperature of room temperature to 110° C.

3. Catalyst composition for polymerizing an olefin monomer comprising (1) an organoaluminum compound selected from the group consisting of di-ethyl-aluminum chloride, di-n-propyl-aluminum chloride and di-iso-butyl-aluminum chloride, (2) titanium trichloride, and (3) methyl methacrylate, and the molar proportion of said organoaluminum compound, said halide of titanium and said methyl methacrylate being 10–0.5:1:0.01–1.

* * * * *